United States Patent [19]

Hattori et al.

[11] Patent Number: 5,098,263
[45] Date of Patent: Mar. 24, 1992

[54] PRESSURE VIBRATION DAMPING DEVICE IN COMBINATION OF LIQUID COLUMN VIBRATION DAMPING MEANS AND PRESSURE PULSE ABSORBING MEANS

[75] Inventors: Katsuhiko Hattori; Hiroshi Kondou, both of Nagoya; Toshio Onuma, Susono; Hiroshi Naito, Toyota; Mutsumi Miyashiro, Kariya; Youitirou Arai, Toyota, all of Japan

[73] Assignees: Kabushiki Kaisha Toyota Chuo Kenkyusho; Toyota Kabushiki Kaisha; Aisin Seiki Kabushiki Kaisha, all of Aichi, Japan

[21] Appl. No.: 575,443

[22] Filed: Aug. 30, 1990

[30] Foreign Application Priority Data

Sep. 5, 1989 [JP] Japan .................. 1-230245

[51] Int. Cl.⁵ .................................. F04B 11/00
[52] U.S. Cl. ...................... 417/540; 417/294; 280/707
[58] Field of Search ............. 417/540, 279, 293, 294; 280/707 R, 702

[56] References Cited

U.S. PATENT DOCUMENTS

| | | | |
|---|---|---|---|
| 2,678,202 | 5/1954 | Brake | 417/540 |
| 3,804,125 | 4/1974 | Sonneman | 417/540 |
| 4,257,458 | 3/1981 | Kondo et al. | 137/855 |
| 4,273,158 | 6/1981 | Chun | 138/30 |
| 4,594,059 | 6/1986 | Becker | 417/540 |
| 4,801,245 | 1/1989 | de Haas et al. | 417/540 |
| 4,892,465 | 1/1990 | Born et al. | 417/218 |
| 4,957,309 | 9/1990 | Komazawa et al. | 280/707 |
| 4,971,353 | 11/1990 | Buma et al. | 280/707 |

FOREIGN PATENT DOCUMENTS

| | | |
|---|---|---|
| 0318721 | 6/1989 | European Pat. Off. . |
| 2620660 | 12/1989 | France . |
| 61-110476 | of 1986 | Japan . |
| 63-176710 | 7/1988 | Japan . |
| 2034855 | 6/1980 | United Kingdom . |

OTHER PUBLICATIONS

Lotus' Active Suspension—Automotive Engineer—Alan Baker.
European Search Report.

*Primary Examiner*—Richard A. Bertsch
*Assistant Examiner*—Charles Freay
*Attorney, Agent, or Firm*—Oliff & Berridge

[57] ABSTRACT

A pressure vibration damping device in a liquid supply passage for supplying a liquid from a pump to a hydraulic device such as a fluid pressure type suspension of a vehicle, including a pressure pulse absorbing means adapted to be able to accept and return a small amount of the liquid from and to said liquid supply passage so as to absorb momentary changes in the flow rate of the liquid in the liquid supply passage, and a liquid column vibration damping means adapted to be able to apply a substantial flow resistance principally to a high velocity flow of the liquid in the liquid supply passage at a part thereof between the pump and the pressure pulse absorbing means, the high flow velocity being due to pulse flows of the liquid induced by a resonance of pulsating output of the pump and the pressure pulse absorbing means and substantially higher than a mean flow velocity of the liquid corresponding to a normal rate of supply of the liquid through the liquid supply passage.

16 Claims, 13 Drawing Sheets

PRESSURE VIBRATION DAMPING DEVICE IN COMBINATION OF LIQUID COLUMN VIBRATION DAMPING MEANS AND PRESSURE PULSE ABSORBING MEANS

BACKGROUND OF THE INVENTION

1. Field of the Invention

The present invention relates to a pressure vibration damping device for incorporation in a liquid supply passage for supplying a liquid from a pump to a hydraulic device.

2. Description of the Related Art

In a hydraulic circuit of a hydraulic device such as a fluid pressure type suspension in a vehicle such as an automobile that requires a constant supply of a liquid at a high pressure, there is generally incorporated a high pressure pump which is excellent in durability but generates relatively large pulses in the flow rate of the liquid. In the hydraulic circuit incorporating such a high pressure pump, relatively large pulses in the flow rate of the liquid are generated due to the liquid flow pulses generated by the pump. Those pulses can not be sufficiently damped by a simple and convenient pressure vibration damping device such as disclosed in, for example, Japanese Utility Model Laid-open Publication 61-110476. Therefore, in a fluid circuit such as the hydraulic circuit of the fluid pressure type suspension it is required that a pressure pulse absorbing means having a higher pressure pulse absorbing performance be incorporated.

However, it was found that when a pressure pulse absorbing means having a high pressure pulse absorbing performance is incorporated in a liquid supply passage, even a larger pressure vibration is generated at a portion closed to the outlet port of the pump in a particular rotational region of the pump, said large pressure vibration having an amplitude 4 to 5 times as large as that generated when no such pressure pulse absorbing means is incorporated, probably because of a resonance between the pulsating output pressure and the pressure pulse absorbing performance of the pressure pulse absorbing means. This amplified pressure vibration was found as being caused by a liquid column vibration having a cycle period corresponding to a cycle period of pulses of the pump that is, for example, a period during which the piston of the pump rotates for one pitch. FIGS. 9 and 10 show the changes in the flow rate and in the pressure of the liquid, respectively, which are observed when such a liquid column vibration occurs. In these figures, the solid lines show those changes in the vicinity of the outlet port of the pump, and the broken lines show those changes in the vicinity of the inlet of the pressure pulse absorbing means. Since no such liquid column vibration occurs in a liquid supply passage incorporating no such pressure pulse absorbing means, it is contemplated that such a liquid column vibration is more apt to occur as the pulse absorbing performance of the pressure pulse absorbing means is improved.

Further, since the region of the rotational speed of the pump in which the liquid column vibration occurs is in the region of the normal rotational speed of the pump, it is not possible to avoid the generation of the liquid column vibration in the liquid supply passage incorporating the pressure pulse absorbing means by shifting the operational speed region of the pump. When the liquid column vibration occurs in the hydraulic system in a vehicle, unpleasant noises and/or vibrations of the vehicle body occur, deteriorating the comfortableness of the vehicle and the durability of the pump and the conduits in the hydraulic circuit.

As a result of various research on the above-mentioned liquid column vibration, the inventors have found that when there exists a certain condition with respect to the phase relation between the vibrating pressures at an upstream end portion and a downstream end portion of a liquid supply passage, said condition being such that, for example, the phase difference between the vibrating pressures at the upstream end portion and the downstream end portion of the liquid supply passage is 180 degrees, there occurs a large liquid column vibration so that the flow rate of the liquid is momentarily so much increased as to generate a pulse, and that such a liquid column vibration can be effectively damped by providing a certain flow resistance in the passage in accordance with the vibration of flow in the passage.

SUMMARY OF THE INVENTION

It is therefore the object of the present invention to provide, based upon the above-mentioned discovery, a pressure vibration damping device which can damp the pressure pulses in a liquid supply passage for supplying a high pressure liquid from a pump to a hydraulic device, said pulses being generated due to the pulsating output of the pump, while suppressing the liquid column vibration being induced by the provision of a pressure pulse absorbing means.

According to the present invention the above-mentioned object is accomplished by a pressure vibration damping device in a liquid supply passage for supplying a liquid from a pump to a hydraulic device, comprising a pressure pulse absorbing means adapted to be able to accept and return a small amount of the liquid from and to said liquid supply passage so as to absorb momentary changes in flow rate of the liquid in said liquid supply passage, and a liquid column vibration damping means adapted to be able to apply a substantial flow resistance principally to a high velocity flow of the liquid in said liquid supply passage at a part thereof between said pump and said pressure pulse absorbing means, said high flow velocity being substantially higher than a mean flow velocity of the liquid corresponding to a normal rate of supply of the liquid through said liquid supply passage.

Said pressure pulse absorbing means may comprise a housing, and a flexible partition for dividing an internal space of said housing into a gas chamber and a liquid chamber, said liquid chamber being communicated with said liquid supply passage.

Said liquid column vibration damping means may comprise an orifice adapted to give a flow resistance to the liquid flowing through said liquid supply passage.

Said liquid column vibration damping means may comprise a check valve which allows the liquid to flow through said liquid supply passage only in a direction of flow from said pump toward said hydraulic device.

The pressure vibration damping device may further comprise a means providing a bypass passage for conducting the liquid to bypass said liquid column vibration damping means, and a valve means for controlling opening of said bypass passage according to rotational speed of said pump so as to throttle said bypass passage when said pump is operating at an operational speed which is apt to induce a liquid column vibration in said liquid supply passage.

Said hydraulic device may be a fluid pressure type suspension of a vehicle such as a automobile comprising an first pressure control valve for controlling supply of the liquid to a front wheel suspension and a second pressure control valve for controlling supply of the liquid to a rear wheel suspension, a first accumulator connected to said liquid supply passage in the vicinity of said first pressure control valve via a first passage means, and a second accumulator connected to said liquid supply passage in the vicinity of said second pressure control valve via a second passage means, wherein a ratio of time of transmission of pressure waves in said first passage means to time of transmission of pressure waves in said second passage means may desirably be in a range of 1.8 to 4.0 or 0.3 to 1.0.

BRIEF DESCRIPTIONS OF THE DRAWINGS

In the accompanying drawings.

DESCRIPTIONS OF THE PREFERRED EMBODIMENTS

Figure 1:
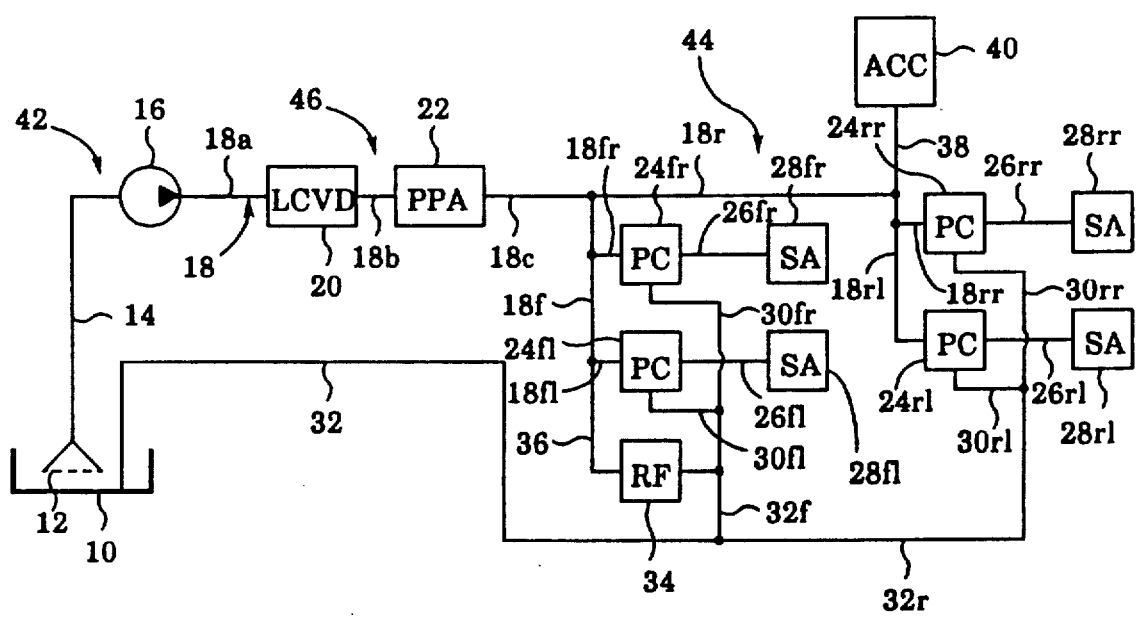
FIG. 1 is a diagrammatic illustration of a fluid circuit of a fluid pressure type suspension incorporating the pressure vibration damping device according to the present invention.

FIG. 1 is a diagrammatic illustration of a fluid flow circuit of a fluid pressure type suspension in which the pressure vibration damping device according to the present invention is incorporated.

In FIG. 1, 10 designates a reservoir for holding an oil to operate as a working fluid. An intake passage 14 leads from the reservoir 10 via a suction filter 12 for removing foreign materials from the oil toward an intake port of a pump 16 which is adapted to be driven by an engine via a belt, both not shown in the figure, over a wide range of rotational speeds, so as to deliver the oil to an oil supply passage 18 at a high pressure with pulses in the flow rate thereof. The oil supply passage 18 includes three parts 18a, 18b and 18c, with a liquid column vibration damping means 20 being provided between the parts 18a and 18b and a pressure pulse absorbing means 22 being provided between the parts 18b and 18c.

To the part 18c are connected a front wheel oil supply passage 18f and a rear wheel oil supply passage 18r. The front wheel oil supply passage 18f is connected with a front right wheel pressure control valve 24fr and a front left wheel control valve 24fl via a front right wheel oil supply passage 18fr and a front left wheel oil supply passage 18fl, respectively. The pressure control valves 24fr and 24fl are connected with a front right wheel shock absorber 28fr and a front left wheel shock absorber 28fl via connecting passages 26fr and 26fl, respectively. Further, the pressure control valves 24fr and 24fl are connected with a front wheel oil exhaust passage 32f via a front right wheel oil exhaust passage 30fr and a front left wheel oil exhaust passage 30fl, respectively. The front wheel oil supply passage 18f is also connected with the front wheel oil exhaust passage 32f via a passage 36 provided with a relief valve 34. The relief valve 34 is adapted to adjust the pressure in the front wheel oil supply passage 18f and the rear wheel oil supply passage 18r to a predetermined value, but not to control a pressure pulse specific to the pump 16 of more than 50 Hz and a liquid column vibration in the oil supply passage 18.

Similarly, the rear wheel oil supply passage 18r is connected with a rear right wheel pressure control valve 24rr and a rear left wheel pressure control valve 24rl via a rear right wheel oil supply passage 18rr and a rear left wheel oil supply passage 18rl, respectively. The pressure control valves 24rr and 24rl are connected with a rear right wheel shock absorber 28rr and a rear left wheel shock absorber 28rl via connecting passages 26rr and 26rl, respectively. Further, the pressure control valves 24rr and 24rl are connected with a rear wheel oil exhaust passage 32r via a rear right wheel oil exhaust passage 30rr and a rear left wheel oil exhaust passage 30rl, respectively. An accumulator 40 is connected via a passage 38 to the rear wheel oil supply passage 18r at a portion thereof close to the rear right and left wheel oil passages 18rr and 18rl. The front and rear oil exhaust passages 32f and 32r are connected with the reservoir 10 via an oil exhaust passage 32.

The pressure control valves 24fr, 24fl, 24rr and 24rl are adapted to control supply of the oil from the corresponding oil supply passages to the corresponding shock absorbers and exhaust of the oil from the corresponding shock absorbers to the corresponding oil exhaust passages so as to control the pressure in the corresponding shock absorbers for controlling the posture of the vehicle body to ensure the riding comfortableness of the vehicle.

Thus, the reservoir 10, the filter 12, the intake passage 14 and the pump 16 construct an oil source means 42 which supplies a high pressure oil, while the pressure control valves 24fr, 24fl, 24rr and 24rl, the shock absorbers 28fr, 28fl, 28rr and 28rl, etc. construct a hydraulic means 44, and further the liquid column vibration damping means 20 and the pressure pulse absorbing means 22 construct a pressure vibration damping device 46 according to the concept of the present invention for damping pressure vibrations in the oil supply passage 18 for conducting the high pressure oil from the oil source means 42 to the hydraulic means 44.

Figure 2:
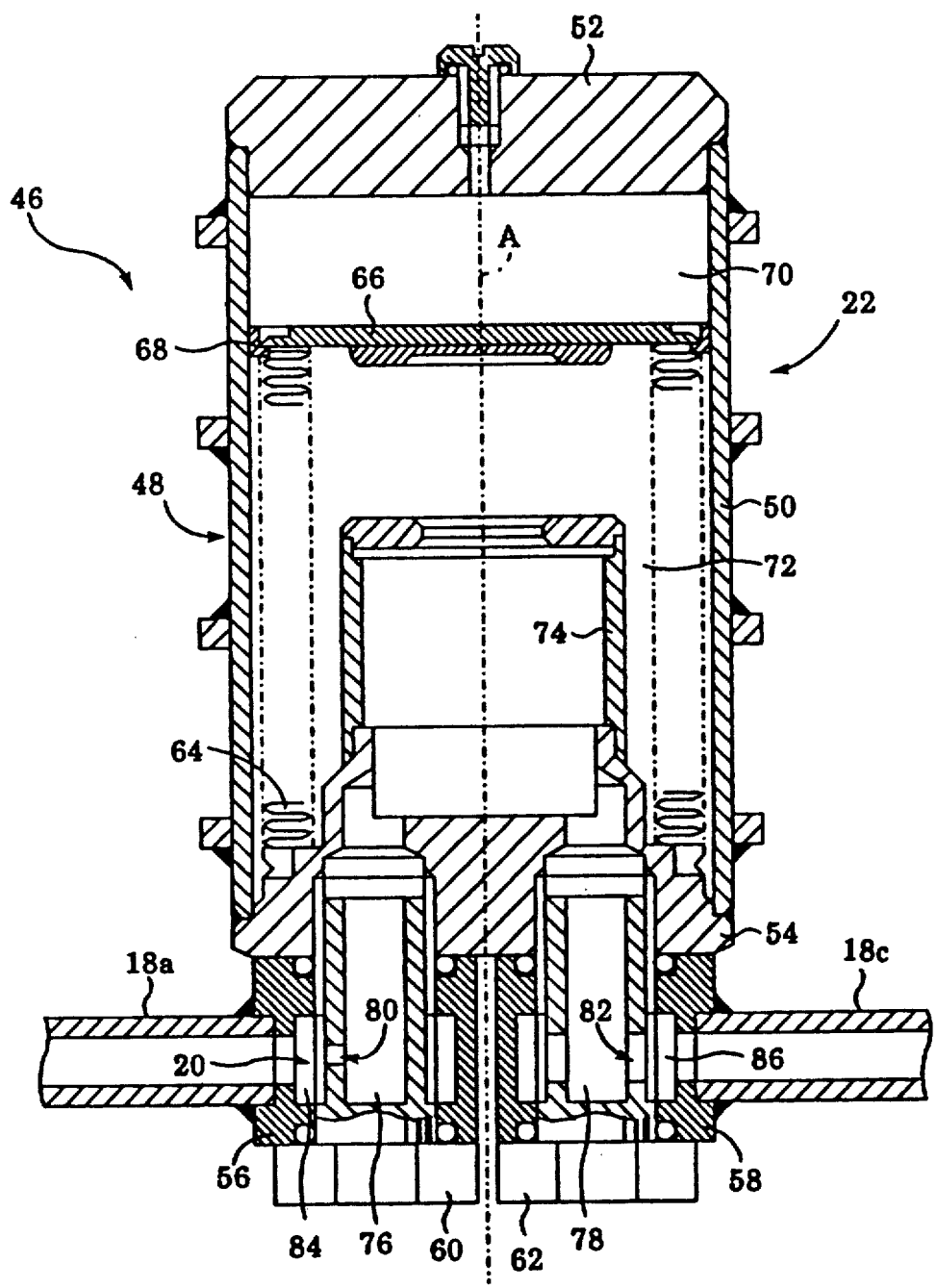
FIG. 2 is a sectional view showing an embodiment of the pressure vibration damping device according to the present invention.

FIG. 2 is a sectional view showing an embodiment of the pressure vibration damping device shown in FIG. 1.

In FIG. 2 the portions corresponding to those shown in FIG. 1 are designated by the same reference numerals.

The pressure vibration damping device 46 shown in FIG. 2 has a construction of integrally incorporating the pressure pulse absorbing means 22 and the liquid column vibration damping means 20 into a unit. The pressure pulse absorbing means 22 has a housing 48 made of a cylindrical body 50, an end cap 52 closing one end of the cylindrical body 50 and a base cap 54 closing another end of the cylindrical body 50. The base cap 54 receives pipes for passages 18a and 18c with nipple members 56 and 58, respectively, said nipple members being fastened to the base cap by bolts 60 and 62, respectively. A bellows 64 extending along an axis A is mounted at its one end to the base cap 54, with its other end being connected with an end plate 66 and a guide ring 68. The bellows 64 and the end plate 66 separate in cooperation the internal space of the housing 48 into a gas chamber 70 and an oil chamber 72. The guide ring 68 slides on the inside surface of the cylindrical body 50 so as to guide the end plate 66 to move along the axis A. A stopper 74 is integrally mounted to the base cap 54 so as to limit the movement of the end plate 66 downward in the figure.

The bolts 60 and 62 have axial passages 76 and 78 as well as radial passages 80 and 82, respectively, and further define annular passages 84 and 86 with the nipples members 56 and 58, respectively. The annular passage 84 is in communication with the passage 18a and the radial passage 80, while the annular passage 86 is in communication with the passage 18c and the radial passage 82. The effective sectional area of the radial passage 80 is smaller than that of the radial passage 82, and provides an orifice which constructs the liquid column vibration damping means 20 for applying a substantial flow resistance principally to high velocity flow of the liquid in the liquid supply passage 18 at a part thereof between the pump 16 and the pressure pulse absorbing means 22, such a high flow velocity being substantially higher than a mean flow velocity of the liquid corresponding to a normal rate of supply of the liquid through the liquid supply passage 18.

Thus, in this embodiment, the oil is taken up by the pump 16 from the reservoir 10 through the intake passage 14 and is delivered to the oil supply passage 18 at a high pressure with pulses in the flow rate corresponding to the rotational speed of the pump. The mean flow rate delivered by the pump 16 increases in proportion to the rotational speed of the pump until the rotational speed of the pump reaches a certain value, and then remains unchanged regardless of further increase of the rotational speed of the pump. The basic cycle period (cycle period of a primary component of the pulses) of the pulses in the flow rate of the oil delivered from the pump corresponds to the period in which the piston of the pump rotates for one pitch, and is inversely proportional to the rotational speed of the pump so that the cycle period gets shorter as the rotational speed of the pump increases. The flow of oil having such pulses in the flow rate flows through the passage 18a and the liquid column vibration damping means 20 into the oil chamber 72 of the pressure pulse absorbing means 22. The pressure pulses of the flow of oil thus transmitted is absorbed by a compression and an expansion of the gas sealed in the gas chamber 70 of the pressure pulse absorbing means 22.

In more detail, as the pressure in the oil chamber 72 of the pressure pulse absorbing means 22 increases for a moment, the end plate 66 is driven upward in the figure due to a difference between the pressure in the oil chamber 72 and that in the gas chamber 70 by pressurizing the gas in the gas chamber 70. The pressure of the gas in the gas chamber 70 increases corresponding to the amount of compression applied thereto up to a pressure which balances the pressure of the oil in the oil chamber 72. Thus an amount of oil corresponding to the amount of compression of the gas in the gas chamber 70 is absorbed by the pressure pulse absorbing means 22, thereby damping the pressure rise in the passage 18a.

On the contrary, when the pressure in the passage 18a decreases for a moment so that the pressure in the oil chamber 72 correspondingly decreases, the end plate 66 is driven downward in the figure due to a difference between the pressure in the gas chamber 70 and the oil chamber 72, thereby expanding the gas chamber 70. Thus an amount of oil corresponding to the amount of expansion of the gas chamber is supplied to the passage 18a so as thereby to attenuate the decrease of pressure in the passage 18a. Although the flexible partition separating the gas chamber from the oil chamber in the pressure pulse absorbing means 22 in the shown embodiment is a bellows, it may be made of a diaphragm, a rubber bag or the like.

If the pressure pulse absorbing means only is provided in the oil supply passage 18 as described above, when the rotational speed of the pump increases to a certain region thereof, a liquid column vibration occurs in the passage 18 so that a large pressure vibration is generated from a vicinity of the delivery port of the pump to a vicinity of the inlet of the pressure pulse absorbing means 22, with oscillatory flows of the liquid forward and backward through the passage 18 at such a high velocity that is substantially higher than a mean flow velocity corresponding to a normal flow rate for the supply of the liquid through the passage 18, thus having a large amplitude of liquid vibration. According to the embodiment shown in FIG. 2 the liquid column vibration damping means 20 is provided at the entrance of the pressure pulse absorbing means 22, said liquid column vibration damping means having the orifice 80 which causes a pressure loss proportional to the square of the flow rate of the oil flowing therethrough so that the flow of oil in the normal direction from the passage 18a to the pressure pulse absorbing means 22 as well as the flow of oil in the opposite direction from the pressure pulse absorbing means 22 to the passage 18a are resisted to a substantially greater extent with increase of the abnormal flow velocity than done in a normal flow of liquid in the normal supply thereof so as thereby to damp the liquid column vibrations.

Figure 11:
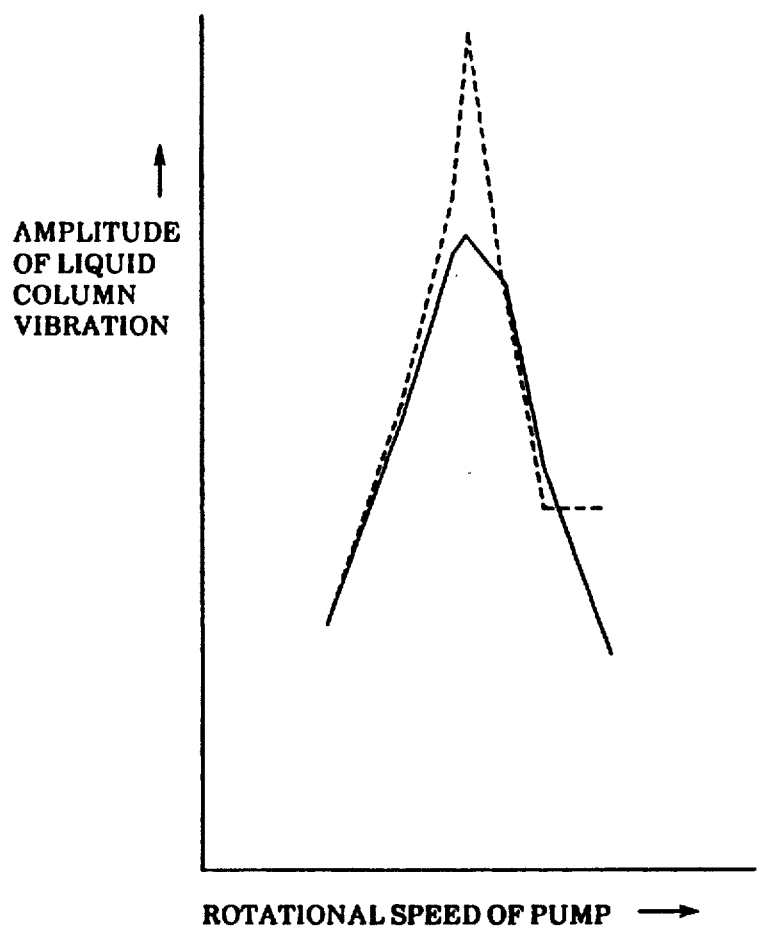
FIG. 11 is a graph showing a reduction of the amplitude of the liquid column vibration available by the incorporation of the liquid column vibration damping means.

FIG. 11 is a graph showing the changes of the amplitude of the liquid column vibration relative to the rotational speed of the pump with respect to a case where the liquid column vibration damping means is provided (solid line) and a case where no liquid column vibration damping means is provided (broken line). As is understood from this graph, the liquid column vibration in a certain region of rotational speed of the pump is effectively decreased by the incorporation of the liquid column vibration damping means between the pump and the pressure pulse absorbing means.

Figure 12:
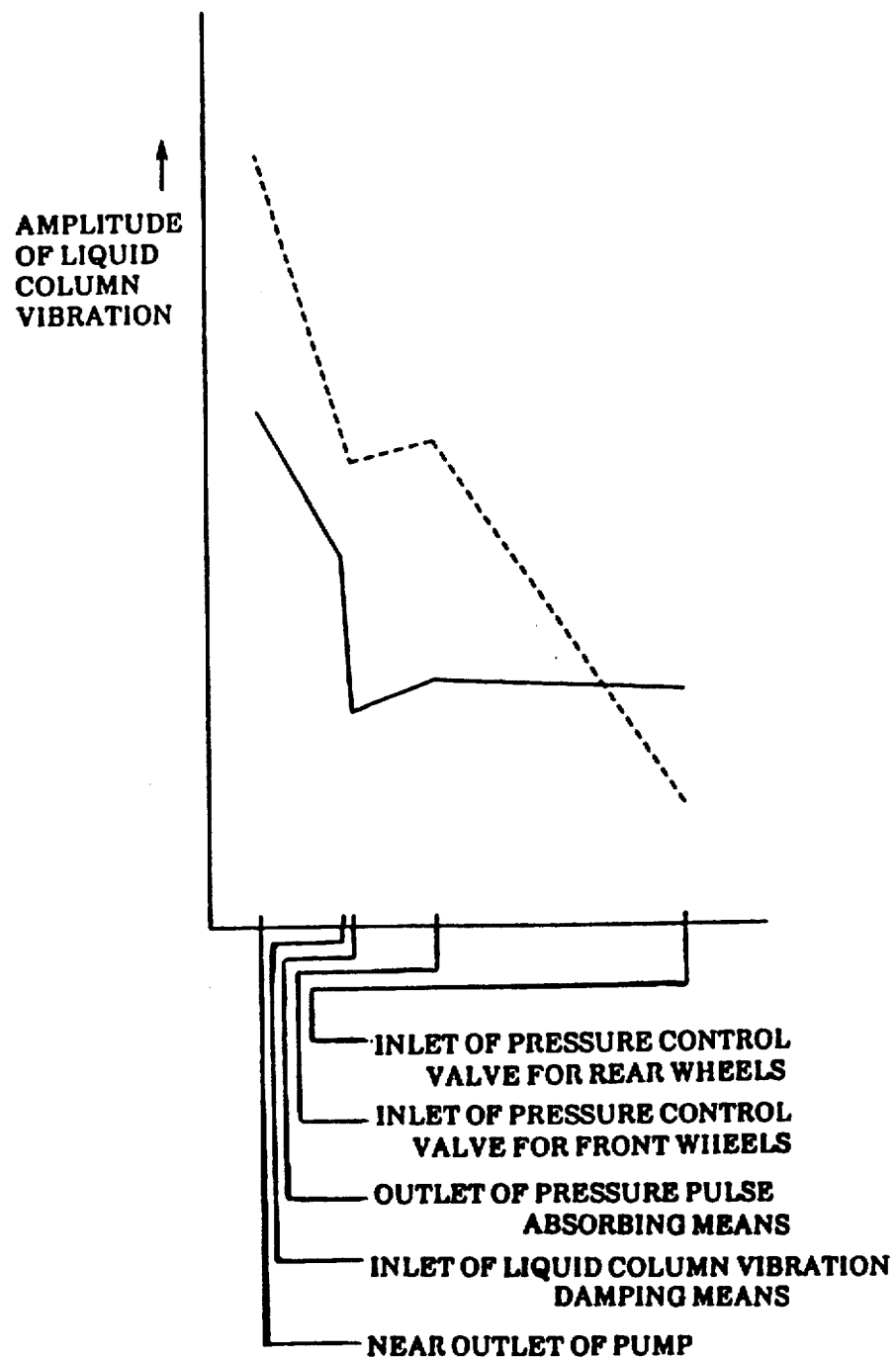
FIG. 12 is a graph showing changes of the amplitude of the liquid column vibrations at various portions along the liquid supply passage available by the incorporation of the liquid column vibration damping means.

FIG. 12 is a graph showing the changes of the amplitude of the liquid column vibration at various portions of the oil supply passage with respect to a case where the liquid column vibration damping means is incorporated (solid line) and a case where no liquid column vibration damping means is incorporated (broken line). It will be understood from this graph that the amplitudes of the liquid column vibrations at various portions of the oil supply passage are effectively decreased by incorporating the liquid column vibration damping means between the pump and the pressure pulse absorbing means.

Figure 3:
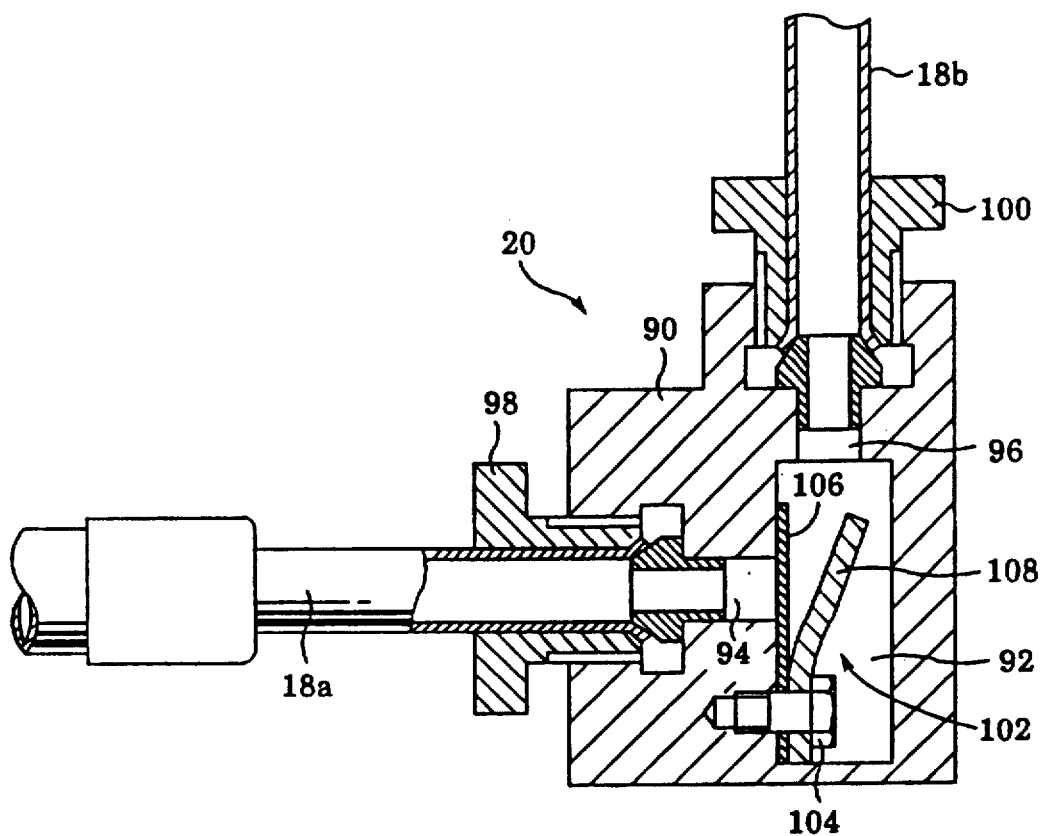
FIGS. 3 through 5 are sectional views showing other embodiments of the liquid column vibration damping means according to the present invention.
Figure 4:
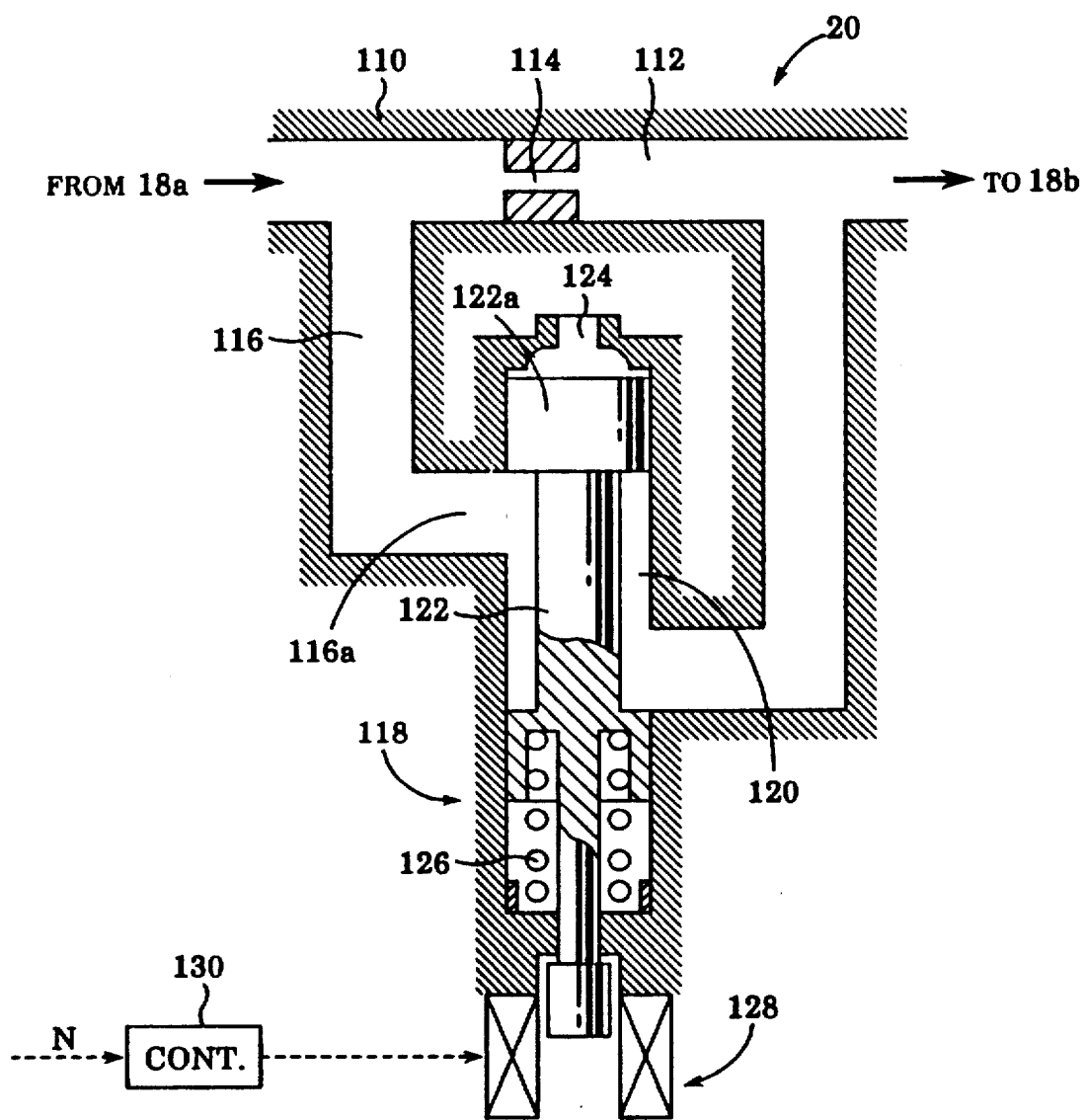
Figure 5:
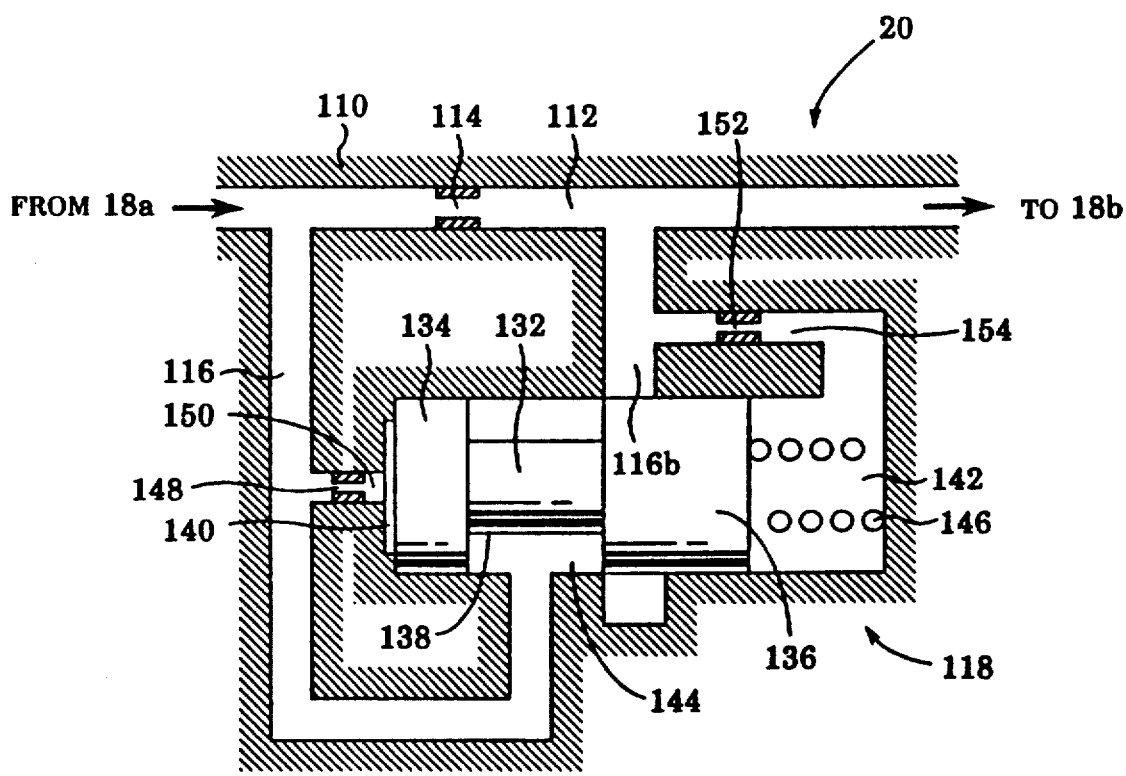

FIGS. 3 through 5 are sectional views showing other embodiments of the liquid column vibration damping means in the pressure vibration damping device according to the present invention. In these figures the portions corresponding to those shown in FIG. 1 are designated by the same reference numerals, and the portions in FIG. 5 corresponding to those shown in FIG. 4 are designated by the same reference numerals as in FIG. 4. Further, the pressure pulse absorbing means to be combined with these liquid column vibration damping means may have any appropriate structure that is, for example, a structure similar to that shown in FIG. 2 with a modification that the radial passage 80 being enlarged to be of the same effective sectional area as the radial passage opening 82.

In the embodiment shown in FIG. 3, a housing 90 has therein a valve chamber 92 and passages 94 and 96 communicating therewith. A conduit means for the passage 18a is connected to the housing 90 by means of a nipple member 98, while a conduit means for the passage 18b is connected to the housing 90 by means of a nipple member 100.

A check valve 102 is provided in the valve chamber 92 so as to allow the oil to flow only in the direction of flowing from the passage 18a to the passage 18b. The check valve 102 comprises a reed type valve element 106 fastened at one end thereof to the housing 90 by a bolt 104, and a stopper 108 for limiting the opening deflection of the valve element.

In this embodiment, since the flow of oil in the direction of flowing from the passage 18b to the passage 18a is prevented by the check valve 102, when a liquid column vibration occurs in the passages 18a and 18b which would cause the oil to flow from the passage 18b to passage 18a, such a reverse flow of oil is prevented by the check valve 102, and thereby the liquid column vibration in the passage 18a is effectively decreased.

In the embodiment shown in FIG. 4, a housing 110 of the liquid column vibration damping means 20 has an internal passage 112 connected with the passage 18a at one end thereof and the passage 18b at another end thereof, and an orifice 114 is provided in the passage 112. Further, the housing 110 has a bypass passage 116 connecting an upstream side with a downstream side of the passage 112, and a bypass control valve 118 is provided so as to control the effective cross sectional area of the bypass passage.

The bypass control valve 118 comprises a valve chamber 120 connected with the bypass passage 116, and a spool type valve element 122 reciprocably disposed in the valve chamber. The valve element 122 has a land 122a for controlling the opening area of a valve port 116a between the valve chamber 120 and the bypass passage 116. An end face of the land 122a remote from the valve chamber is exposed to the atmosphere through an air port 124. A compression coil spring 126 is provided between an end of the valve element 122 opposite to the land 122a and the housing so as to bias the valve element 122 upward in the figure and thereby normally to maintain the port 116a in its fully opened state.

The position of the valve element 120 is controlled by a solenoid actuator 128 which is controlled by a control means 130. The control means 130 receives a signal indicative of the rotational speed N of the pump 16, and when the rotational speed N comes in a region of inducing the liquid column vibration in the passages 18a and 18b, outputs a control signal to the actuator 128 so as to let the actuator drive the valve element 122 downward in the figure against the force of the spring 126 and thereby to decrease the opening area of the port 116a.

Thus, according to this embodiment, when the rotational speed of the pump reaches a value of inducing the liquid column vibration, the effective opening area of the bypass passage 116 is decreased or zeroed so as thereby to compel the flow of oil from the passage 18a to the passage 18b through the liquid column vibration damping means 20 and the flow of oil in the opposite direction to flow through the orifice 114, so that the liquid column vibration is effectively damped by the flow resistance applied by the orifice 114, the throttling ratio of which is determined according to the same principle as the orifice 80 in FIG. 2.

According to this embodiment, when the rotational speed of the pump is not in the region of inducing the liquid column vibration, the bypass valve 118 is maintained in its fully opened state so as to keep the pressure loss by the liquid column vibration damping means 20 at the minimum.

In the embodiment shown in FIG. 5, the bypass valve 118 provided in the bypass passage 116 is constructed as a pilot valve. A valve element 132 of the pilot type bypass valve 118 has two lands 134 and 136 and an annular groove 138 provided between the two lands. The land 134 cooperates with the housing 110 to define a pilot chamber 140, while the land 136 cooperates with the housing 110 to define a pilot chamber 142, with the annular groove 138 cooperating with the housing 110 to define an annular passage 144. A compression coil spring 146 is provided in the pilot chamber 142 so as to bias the valve element 132 leftward in the figure and thereby normally to close a port 116b in the bypass passage 116.

The pilot chamber 140 is connected with a part of the bypass passage 116 located upstream of the bypass valve 118 through a pilot passage 150 having an orifice 148 so that the pilot chamber 140 is supplied with the pressure in the passage 112 upstream of the orifice 114. Similarly the pilot chamber 142 is connected with a part of the bypass passage 116 located downstream of the bypass valve through a pilot passage 154 having an orifice 152 so that the pilot chamber 142 is supplied with the pressure in the passage 112 downstream of the orifice 114. The spring force of the compression coil spring 146 is determined so as to maintain the valve element 138 at a valve closing position such as shown in the figure when the rotational speed of the pump is below the region of inducing the liquid column vibration in the passages 18a and 18b.

Thus, according to this embodiment, when the rotational speed of the pump is in and below the rotational speed region of inducing the liquid column vibration, the bypass valve 118 is maintained in its closed state as shown in the figure so that the flow of oil through the passages 18a and 18b is all compelled to flow through the orifice 114 which is designed to apply a flow resistance to the flow of oil enough to effectively damp the liquid column vibration if it occurs in the passage 112 when the rotational speed of the pump reaches the region of inducing the liquid column vibration.

When the rotational speed of the pump further increases beyond the region of inducing the liquid column vibration with a corresponding further increase of the flow of oil from the passage 18a to the passage 18b through the passage 112, the pressure drop across the orifice 114 increases so much that the difference between the pressures in the pilot chambers 140 and 142 overcomes the spring force of the compression coil spring 146, and then the valve element 132 is driven rightward in the figure so as to open the port 116b. As a result a part of the oil to flow through the passage 112 bypasses the orifice 114 through the passage 116, and thereby the pressure drop due to the liquid column vibration damping means 20 is decreased.

Figure 6:
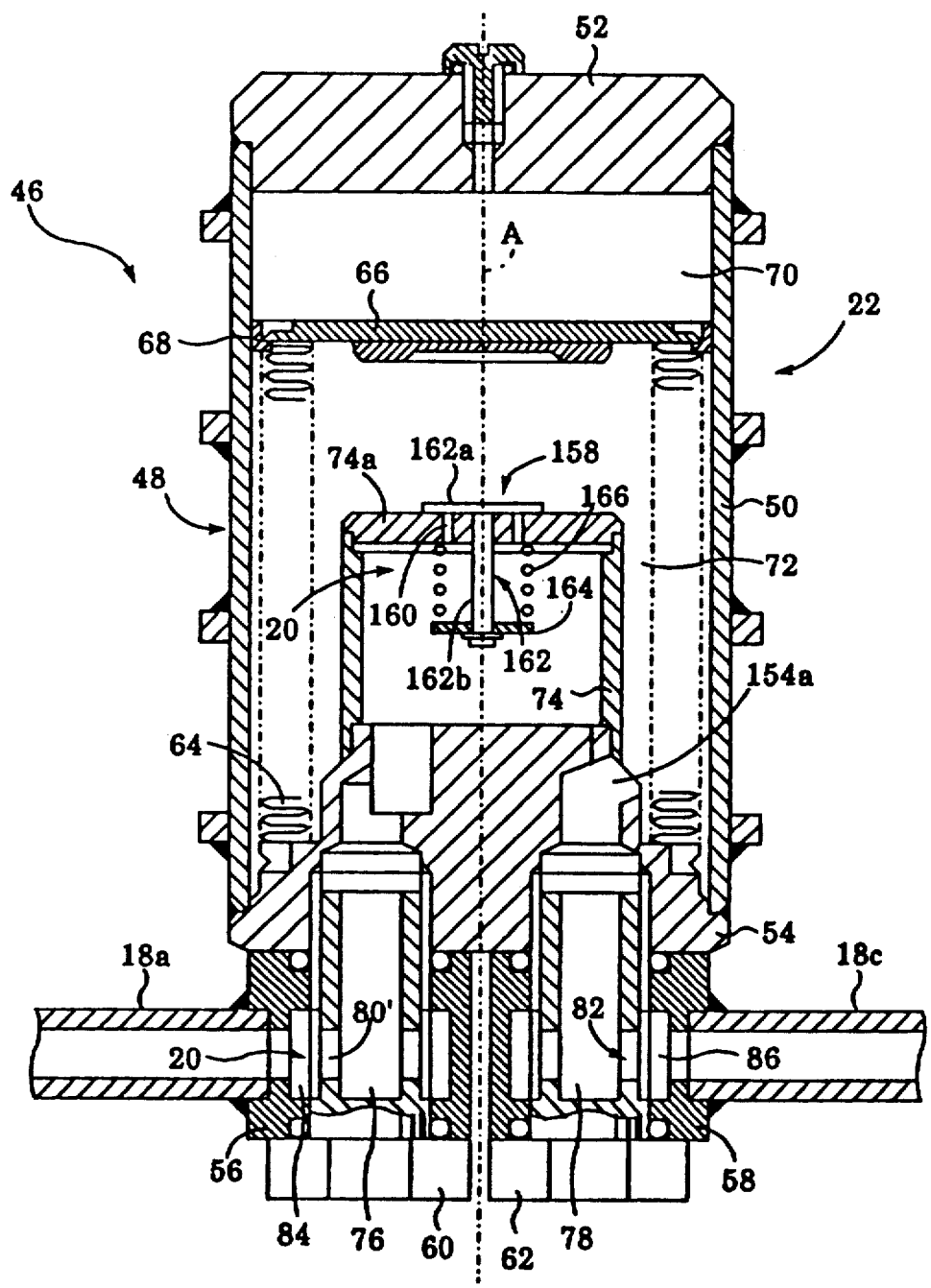
FIG. 6 is a sectional view showing another embodiment of the pressure vibration damping device according to the present invention.

FIG. 6 is a sectional view similar to FIG. 2 showing still another embodiment of the pressure vibration damping device according to the present invention. In FIG. 6 the portions substantially the same as those shown in FIG. 2 are designated by the same reference numerals as in FIG. 2.

In this embodiment, the radial passage 80' provided in the bolt 60 is formed to have substantially the same effective cross sectional area as the radial passage 82 in the bolt 62 and therefore to apply no substantial throttling effect to the flow of oil flowing therethrough. Further, the axial passage 78 provided in the bolt 62 is connected with the oil chamber 72 through a passage 154a provided in the base cap 54.

In this embodiment, the liquid column vibration damping means 20 is provided in the housing of the pressure pulse absorbing means 22. The liquid column vibration damping means 20 comprises a check valve 158 supported by the stopper 74. The check valve 158 comprises a plurality of ports 160 provided in an end plate 74a of the stopper 74 so as to connect the oil chamber 72 with an internal space of the stopper, said ports 160 being adapted to be selectively closed by a valve element 162 which comprises a plate portion 162a and a stem portion 162b extending from said plate portion perpendicularly thereto and received in a bore formed in the end plate 74a to be reciprocable along the axis A. A spring seat 164 is supported by the lower end of the stem portion 162b, and a compression coil spring 166 is mounted between said spring seat 164 and the end plate 74a so as to bias the valve element 162 downward in the figure. Thus, the check valve 158 allows the oil to flow only in a direction of flowing from the inside of the stopper 74 to the oil chamber 72 through the ports 160.

Thus, according to this embodiment, when the rotational speed of the pump reaches the region of inducing the liquid column vibration in the passage 18a, the inverse flow of oil due to liquid column vibration directed from the oil chamber 72 to the internal space of the stopper 74 is prevented by the check valve 158, thereby effectively damping the liquid column vibration.

Figure 7:
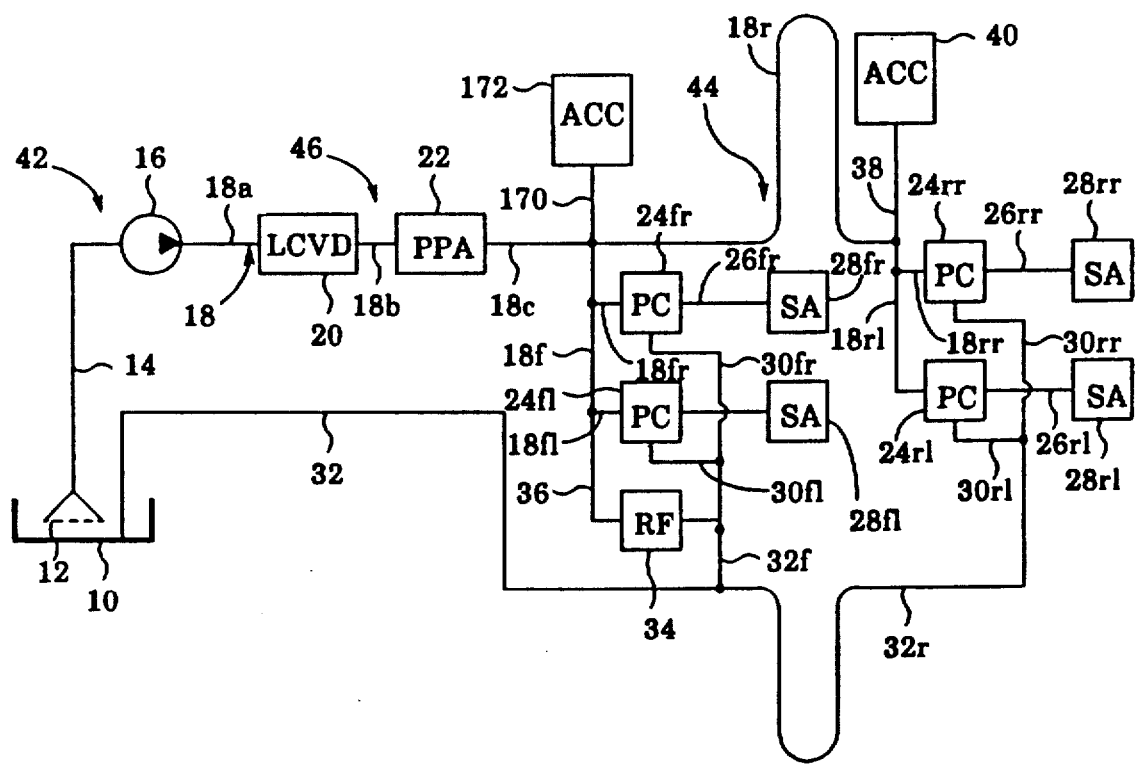
FIGS. 7 and 8 are diagrammatic illustrations showing other embodiments of the fluid circuits incorporating the pressure vibration damping device according to the present invention.

FIG. 7 is a diagrammatic illustration similar to FIG. 1, showing another fluid circuit of a fluid type suspension in which the present invention is incorporated. In FIG. 7 the portions substantially the same as those shown in FIG. 1 are designated by the same reference numerals as in FIG. 1. Further, the pressure vibration damping device in this embodiment may be the same as the one shown in FIG. 2 or 6, and the liquid column vibration damping means 20 may be any of those shown in FIGS. 3 through 5.

In this embodiment, an accumulator 172 is connected by a passage 170 to a joining portion of the passage 18c, the passage 18r, and the passage 18f, so that the pressure drop in the passages 18f and 18r due to the operation of the pressure control valves 24fr and 24fl for the front wheels and the pressure control valves 24rr and 24rl for the rear wheels is effectively compensated.

Figure 13:
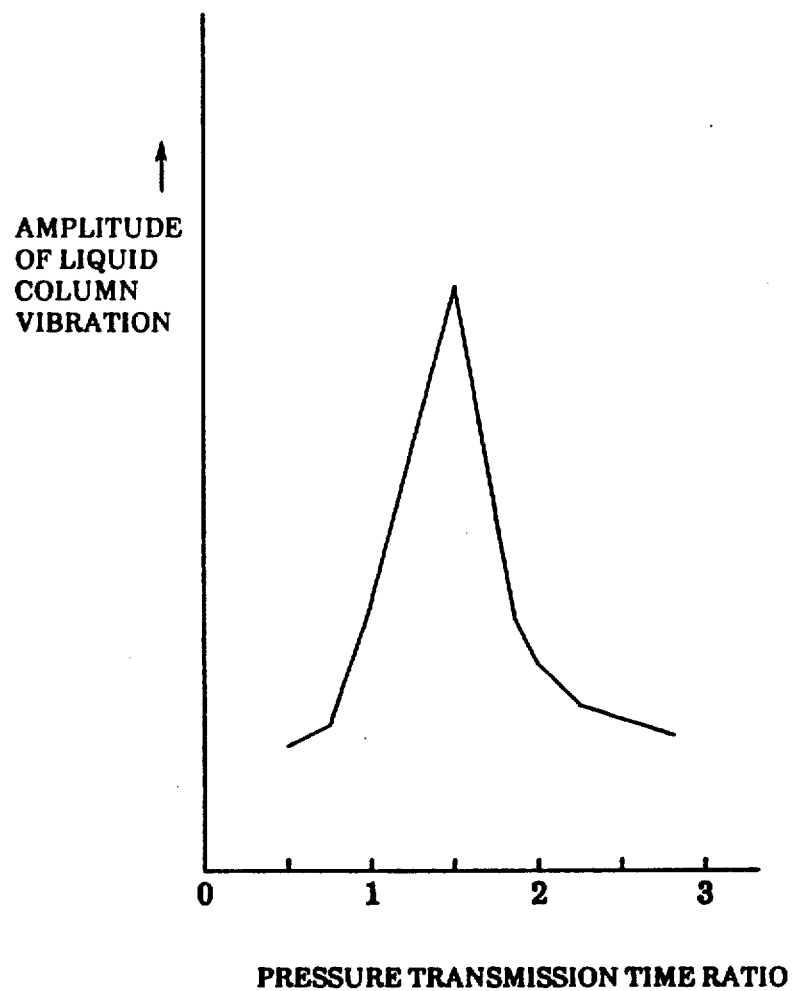
FIG. 13 is a graph showing the relation between the pressure transmission time ratio and the amplitude of the liquid column vibrations.

The inventors have found that when the accumulators are respectively connected to the opposite ends of the passage 18r extending between the pressure control valves for the front and rear wheels, a liquid column vibration occurs in the passage 18r, and the amplitude thereof changes in accordance with a ratio of the time of transmission of the pressure waves in the passage 170 to the time of transmission of the pressure waves in the passage 38 as shown in FIG. 13, said ratio being referred to as "pressure transmission time ratio" hereinunder.

As seen from FIG. 13 it is desirable that the pressure transmission time ratio is more than 1.8 or less than 1.0, and that the amplitude of the pressure vibration decreases the more as the pressure transmission time ratio gets the more above 1.8 or the less below 1.0. The time for the transmission of the pressure wave to the accumulator can be increased by increasing the length of the passage leading to the accumulator and/or decreasing the rigidity of the material constructing the passage. However, when the time for the transmission of the pressure wave is increased, the effect of the accumulator for compensating the pressure drop lowers. Alternatively, the time for the transmission of the pressure wave to the accumulator can be decreased by decreasing the length of the passage leading to the accumulator and/or increasing the rigidity of the material constructing the passage. However, a longer passage decreases the convenience of mounting thereof and increases the weight of the vehicle, while a more rigid construction of the passage increases transmission of the vibration or generation of a noise due to operation of the control valves and decreases durability of the device. In view of these it is desirable that the pressure transmission time ratio is in the rage of 1.8 to 4.0 or in the range of 0.3 to 1.0.

Thus, according to this embodiment, the liquid column vibration generated in the passages 18a and 18b is effectively damped by the liquid column vibration damping means 20, and further a large amplitude is avoided in the liquid column vibration in the passage 18 by the length and the rigidity of the material constructing the passages 170 and 38 are selected to provide the pressure transmission time ratio in the above-mentioned desirable range.

Figure 8:
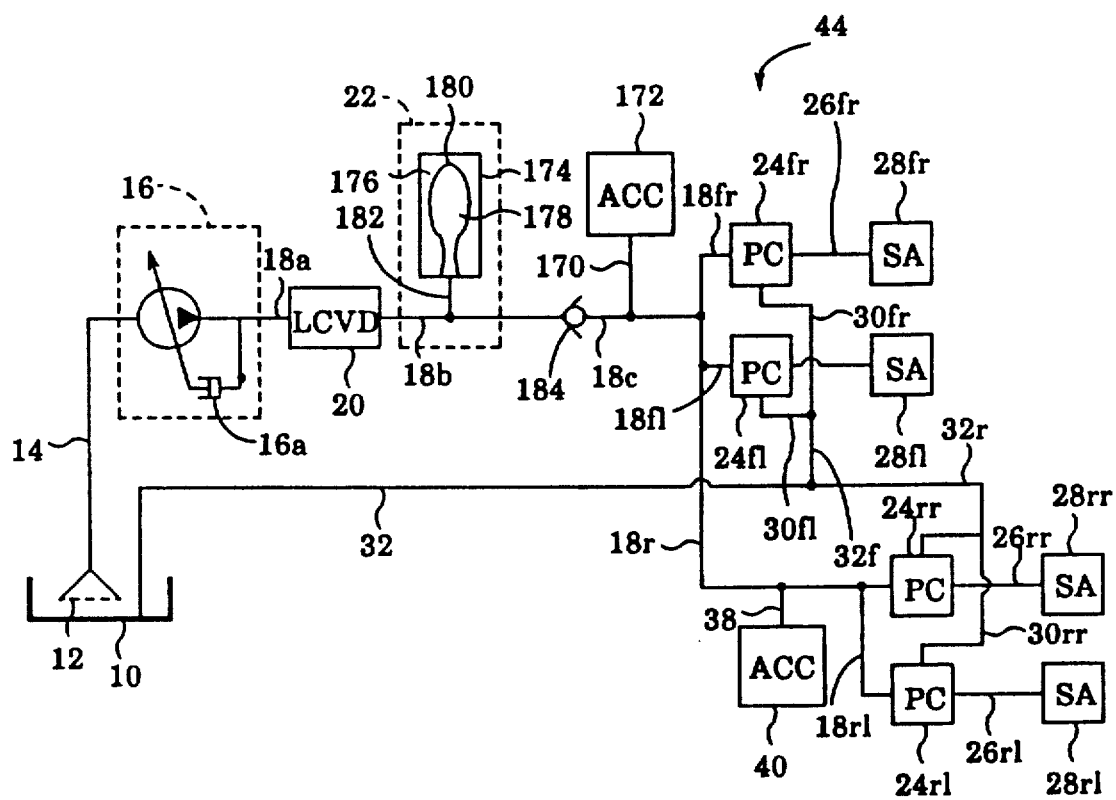
Figure 9:
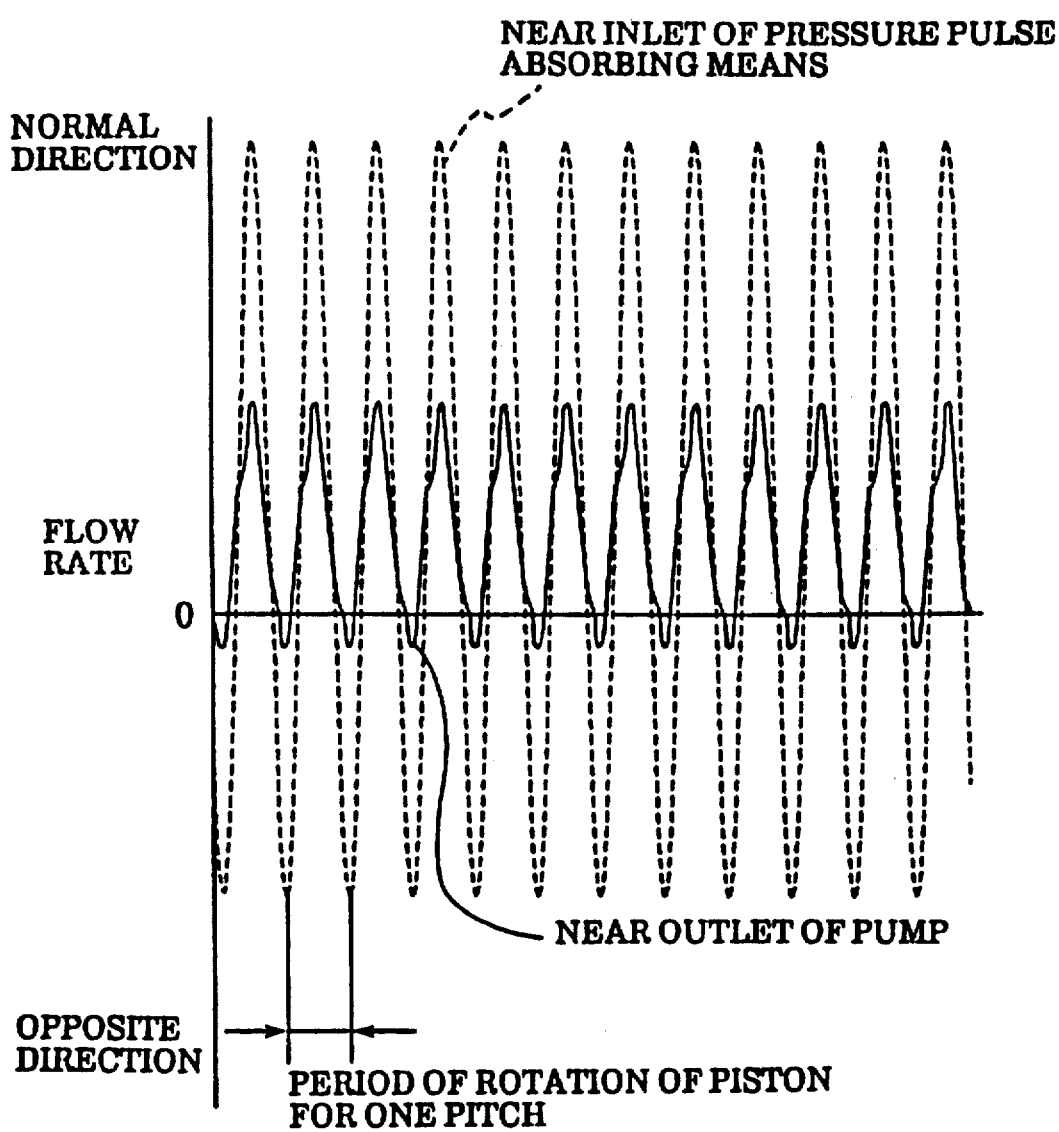
FIGS. 9 and 10 are graphs showing changes in the flow rate and changes in the pressure when the liquid column vibrations are being generated, respectively.
Figure 10:
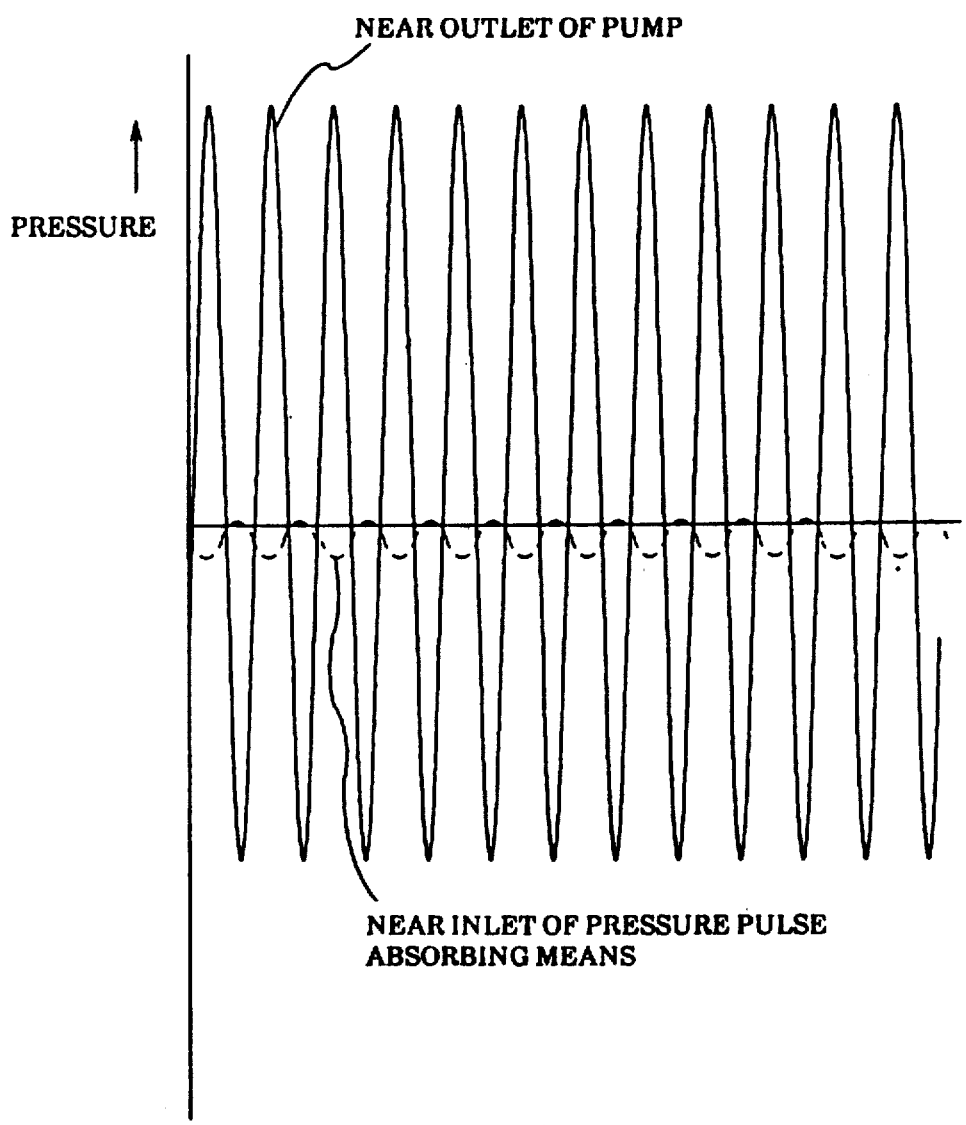

FIG. 8 is a diagrammatic illustration similar to FIGS. 1 and 7, showing still another embodiment of the fluid circuit in which the pressure vibration damping device according to the present invention is incorporated.

In FIG. 8, the portions substantially the same as those in FIGS. 1 and 7 are designated by the same reference numerals as in FIGS. 1 and 7.

In this embodiment, the pump 16 is a variable displacement pump with a constant pressure control means. The pump 16 incorporates therein a variable displacement mechanism 16a which detects the pressure in the passage 18a and controls the amount of delivery of the pump so as to decrease it when the detected pressure is higher than a predetermined value and to increase it when the detected pressure is lower than a predetermined value, thus maintaining the delivery pressure at a constant value. Even by use of this type of pump, however, it is not possible to obviate the pressure vibration in the passage 18a, and therefore, the pressure pulse absorbing means 22 is provided between the passages 18b and 18c.

In this embodiment, the pressure pulse absorbing means 22 is constructed as a bladder type oil supply passage means. The pressure pulse absorbing means 22 comprises a housing 174, and a rubber bag 180 separating the internal space of the housing into a gas chamber 176 and an oil chamber 178, said oil chamber 178 being connected with a joining portion of the passages 18b and 18c by a passage 182. In this pressure pulse absorbing means, when the pressure in the passage 18b increases for a moment, the oil chamber 178 expands while compressing the gas in the gas chamber 176, whereas when the pressure in the passage 18b decreases for a moment, the oil chamber 178 contracts thereby supplying a part of the oil contained therein to the passage 18b through the passage 182, thus absorbing the pressure changes in the passage 18b.

Further, a check valve 184 is provided in the passage 18c so as to allow the oil to flow only in a direction of flowing from the pressure pulse absorbing means 22 to the hydraulic device 44. This check valve prevents the high pressure oil from flowing inversely through the passage 18 from the accumulators 40 and 172 during stoppage of the pump, and thereby avoids an overload being imposed on the engine when the pump is started.

In this embodiment, the liquid column vibration damping means 20 may have the same construction as those shown in FIGS. 3 through 5.

Thus, as will be apparent from the foregoing descriptions, according to the present invention the pressure pulses due to the pulsating pumping by the pump are effectively damped by the pressure pulse absorbing means, while the liquid column vibrations which would be induced in the oil supply passage in a particular region of the rotational speed of the pump due to the incorporation of the pressure pulse absorbing means therein are suppressed by the provision of the liquid column vibration damping means, so that the pressure pulses in the oil supply passage are totally effectively damped, thereby avoiding vibrations and/or noises due to such pressure pulses, thereby improving the comfortability of the vehicle and the durability of the fluid circuit system.

Although the invention has been described in detail with respect to some preferred embodiments thereof, it will be apparent to those skilled in the art that various modifications are possible within the scope of the present invention.

What is claimed is:

1. A pressure vibration damping device in a liquid supply passage for supplying a liquid from a pump to a hydraulic device, comprising: a pressure pulse absorbing means adapted to be able to accept and return a small amount of the liquid from and to said liquid supply passage with no substantial reaction against flowing-in of the liquid thereto by receiving the liquid in an expandable liquid chamber so as to absorb in a collapsing chamber momentary changes in flow rate of the liquid in said liquid supply passage, and a liquid column vibration damping means provided in said liquid supply passage adjacent an inlet to said pressure pulse absorbing means and adapted to be able to apply a substantial flow resistance principally to a high velocity flow of the liquid in said liquid supply passage at a part thereof between said pump and said pressure pulse absorbing means due to said momentary changes in flow rate of the liquid in said liquid supply passage, said high flow velocity being substantially higher than a mean flow velocity of the liquid corresponding to a normal rate of supply of the liquid to said liquid supply passage.

2. A pressure vibration damping device according to claim 1, wherein said pump is a constant displacement pump.

3. A pressure vibration damping device according to claim 1, wherein said pump is a variable displacement pump.

4. A pressure vibration damping device according to claim 1, wherein said pressure pulse absorbing means comprises a housing, and a flexible partition for dividing an internal space of said housing into said collapsible chamber and said expandable liquid chamber, said expandable liquid chamber being communicated with said liquid supply passage and said collapsible chamber being a gas chamber.

5. A pressure vibration damping device according to claim 4, wherein said flexible partition is a bellows.

6. A pressure vibration damping device according to claim 4, wherein said flexible partition is a rubber bag.

7. A pressure vibration damping device according to claim 1, wherein said liquid column vibration damping means comprises an orifice adapted to give a flow resistance to the liquid flowing through said liquid supply passage.

8. A pressure vibration damping device according to claim 4, wherein said liquid column vibration damping means comprises an orifice adapted to give a flow resistance to the liquid flowing through said liquid supply passage, and said orifice is provided between said liquid chamber and said pump.

9. A pressure vibration damping device according to claim 1, wherein said liquid column vibration damping means comprises a check valve which allows the liquid to flow through said liquid supply passage only in a direction of flowing from said pump toward said hydraulic device.

10. A pressure vibration damping device according to claim 9, wherein said check valve is a reed type valve.

11. A pressure vibration damping device according to claim 9, wherein said check valve comprises a port for connecting said pressure pulse absorbing means with said pump and a plate portion elastically biased in a direction for closing said port.

12. A pressure vibration damping device in a liquid supply passage for supplying a liquid from a pump to a hydraulic device, comprising: a pressure pulse absorbing means adapted to be able to accept and return a small amount of the liquid from and to said liquid said liquid supply passage so as to absorb momentary changes in flow rate of the liquid in said liquid supply passage; a liquid column vibration damping means adapted to be able to apply a substantial flow resistance principally to a high velocity flow of the liquid in said liquid supply passage at a part thereof between said pump and said pressure pulse absorbing means, said high flow velocity being substantially higher than a mean flow velocity of the liquid corresponding to a normal rate of supply of the liquid through said liquid supply passage; a means providing a bypass passage for conducting the liquid to bypass said liquid column vibration damping means, and a valve means for controlling opening of said bypass passage according to rotational speed of said pump so as to throttle said bypass passage when said pump is operating in an operational speed region which is apt to induce a liquid column vibration in said liquid supply passage.

13. A pressure vibration damping device according to claim 12, wherein said valve means is a spool type valve having a spool and a solenoid actuator for driving said spool thereof.

14. A pressure vibration damping device in a liquid supply passage for supplying a liquid from a pump to a hydraulic device, comprising: a pressure pulse absorbing means adapted to be able to accept and return a small amount of the liquid from and to said liquid supply passage so as to absorb momentary changes in flow rate of the liquid in said liquid supply passage; a liquid column vibration damping means adapted to be able to apply a substantial flow resistance principally to a high velocity flow of the liquid in said liquid supply passage at a part thereof between said pump and said pressure pulse absorbing means, said high flow velocity being substantially higher than a mean flow velocity of the liquid corresponding to a normal rate of supply of the liquid through said liquid supply passage; a means providing a bypass passage for conducting the liquid to bypass said liquid column vibration damping means, and a valve means for controlling opening of said bypass passage according to rotational speed of said pump so as to throttle said bypass passage when said pump is operating in and below an operational speed region which is apt to induce a liquid column vibration in said liquid supply passage and to open said bypass passage when said pump is operating at an operational speed above said operational speed region.

15. A pressure vibration damping device according to claim 14, wherein said liquid column vibration damping means is an orifice, and said valve means is a spool type valve adapted to be driven by a pressure difference between upstream and downstream sides of said orifice.

16. A pressure vibration damping device in a liquid supply passage for supplying a liquid from a pump to a hydraulic device, comprising:
a pressure pulse absorbing means capable of accepting and returning a small amount of the liquid from and to the liquid supply passage to absorb momentary changes in flow rate of the liquid in the liquid supply passage; and
a liquid column vibration damping means for applying a substantial flow resistance principally to a high velocity flow of liquid in the liquid supply passage at a part thereof between the pump and said pressure pulse absorbing means, the high flow velocity being substantially higher than a mean flow velocity of the liquid corresponding to a normal rate of supply of the liquid through the liquid supply passage, wherein the hydraulic device is a fluid pressure type suspension of a vehicle which further comprises a first pressure control valve for controlling supply of the liquid to a front wheel suspension and a second pressure control valve for controlling supply of the liquid to a rear wheel suspension;
a first accumulator connected to said liquid supply passage in the vicinity of said first pressure control valve via a first passage means; and
a second accumulator connected to said liquid supply passage in the vicinity of said second pressure control valve via a second passage means, wherein a ratio of time of transmission of pressure waves in said first passage means to a time of transmission of pressure waves in said second passage means is in a range of 1.8 to 4 or 0.03 to 1.0.

* * * * *

UNITED STATES PATENT AND TRADEMARK OFFICE
CERTIFICATE OF CORRECTION

PATENT NO. : 5,098,263
DATED : March 24, 1992
INVENTOR(S) : Katsuhiko Hattori, et. al.

It is certified that error appears in the above-indentified patent and that said Letters Patent is hereby corrected as shown below:

Title page, item [73], inventors: should be -- Kabushiki Kaisha Toyota Chuo Kenkyusho, Toyota Jidosha Kabushiki Kaisha and Aisin Seiki Kabushiki Kaisha--.

Signed and Sealed this

Ninth Day of August, 1994

Attest:

BRUCE LEHMAN

*Attesting Officer*   *Commissioner of Patents and Trademarks*